United States Patent [19]
Yu

[11] Patent Number: 5,748,908
[45] Date of Patent: May 5, 1998

[54] AUTOMATED, CLASSIFIED EXPENDITURE DATA CARD RECORDING SYSTEM

[76] Inventor: Mason K. Yu, 550 W. Brown, Suite #3, Birmingham, Mich. 48009

[21] Appl. No.: 476,894

[22] Filed: Jun. 7, 1995

[51] Int. Cl.$^6$ .......................... G06F 15/00; G06F 15/20; G06K 5/00; B42D 15/00
[52] U.S. Cl. .......................... 395/244; 395/216; 395/235; 235/376; 235/380; 283/904
[58] Field of Search .......................... 364/401, 403, 364/404, 406; 235/375, 380, 376, 385; 209/567, 569; 283/904, 901; 902/22; 379/91, 144, 112, 114; 395/244, 241, 242, 243, 228, 230, 216

[56] References Cited

U.S. PATENT DOCUMENTS

| | | | |
|---|---|---|---|
| 3,980,323 | 9/1976 | Boyreau | 283/57 |
| 4,100,011 | 7/1978 | Foote | 156/272 |
| 4,172,552 | 10/1979 | Case et al. | 235/380 |
| 4,179,139 | 12/1979 | Savar | 282/23 R |
| 4,400,017 | 8/1983 | Pendergrass | 283/66 A |
| 4,522,670 | 6/1985 | Caines | 156/220 |
| 4,557,963 | 12/1985 | Caines | 428/156 |
| 4,689,018 | 8/1987 | Trinity | 238/904 |
| 4,700,052 | 10/1987 | Kashkashian, Jr. | 235/379 |
| 4,722,054 | 1/1988 | Yorozu et al. | 364/401 |
| 4,800,254 | 1/1989 | Suzuki et al. | 235/385 |
| 5,019,696 | 5/1991 | Chang | 235/436 |
| 5,119,294 | 6/1992 | Tanaka | 364/405 |
| 5,193,055 | 3/1993 | Brown et al. | 364/406 |
| 5,241,600 | 8/1993 | Hillis | 380/23 |
| 5,256,863 | 10/1993 | Ferguson et al. | 235/383 |
| 5,291,399 | 3/1994 | Chaco | 235/380 |
| 5,326,964 | 7/1994 | Risser | 283/904 |
| 5,334,823 | 8/1994 | Noblett, Jr. et al. | 235/380 |
| 5,352,876 | 10/1994 | Watanabe et al. | 235/381 |
| 5,355,411 | 10/1994 | MacDonald | 380/23 |
| 5,384,449 | 1/1995 | Peirce | 235/380 |
| 5,428,210 | 6/1995 | Nair et al. | 235/380 |
| 5,566,327 | 10/1996 | Sehr | 235/380 |

*Primary Examiner*—Curtis Kuntz
*Assistant Examiner*—Paul Loomis
*Attorney, Agent, or Firm*—Vivian Yu Lee; Gregory J. Yu; Mason K. Yu, Jr.

[57] ABSTRACT

This is an expenditure data recording system using a uniquely designed classification binary code (or its equivalent) stored within the point of sale terminal system consisting of a cash register, a credit/debit card reader, and a telecommunications line. In a sales transaction, a credit/debit card passes through this reconfigured point of sale terminal not only to furnish relevant information (date/time, vendor identification, cardholder's name and account number, and transaction amount), but also to classify the expenditure by category via instant telecommunications link upon approval by the credit/debit card issuer (financial institution). Whenever there is a needed classification change at the point of sale terminal, one utilizes a unique set of color, binary-encoded cards to redefine a new expenditure category. Whereupon the credit/debit card issuer can process this classified expenditure sales transaction information to produce a periodic financial report, and remit it to the credit/debit account holder at any time. This entire operational system is virtually transparent to the cardholder and sales personnel.

3 Claims, 11 Drawing Sheets

EXPENSE CLASSIFICATION / BINARY- AND COLOR- CODED SECONDARY CARD

| EXPENSE CLASSIFICATION | SUGGESTED STORES AND SERVICES | BINARY SEQUENTIAL NO. | COLOR CODED | POINT OF SALES TERMINAL NO. |
|---|---|---|---|---|
| Advertising | Magazines, newspapers, radio, television | 000001 | Light Blue | QR 456789 |
| Clothing | Department and specialty | 000010 | Purple | DE 345678 |
| Donations | Churches, synagogues, *United Way* | 000011 | Silver | MN 456789 |
| Education | Childcare, job training, tuition | 000100 | Light Yellow | BC 123456 |
| Food | Groceries, produce, deli markets | 000101 | Green | EF 456789 |
| Medical | Dentist, doctors, drugs | 000110 | Red | AB 012345 |
| Mortgage / Rent | Banks, credit unions, financial management | 000111 | Bronze | PQ 012345 |
| Purchasing | Goods, materials, supplies, tools | 001000 | Pink | KL 345678 |
| Recreation | Entertainment, sporting events, vacations | 001001 | Medium Blue | CD 234567 |
| Transportation | Airlines, auto, bus, fuel/oil | 001010 | Brown | RS 098765 |
| Utilities: Electric | Local service | 001011 | Grey | FG 567890 |
| Utilities: Gas | Local service | 001100 | Grey | GH 012345 |
| Utilities: Telephone | Local/Long distance services | 001101 | Grey | HJ 123456 |
| Utilities: Water | Local service | 001110 | Grey | JK 234567 |
| Miscellaneous | - - - | 001111 | Orange | NP 567890 |

*Fig. 7*

| EXPENSE CLASSIFICATION | BINARY SEQUENTIAL NO. | | A B C C S A M P L E |
|---|---|---|---|
| COLOR CODED | POINT OF SALES TERMINAL NUMBER | | |
| Clothing | 000010 | | |
| Purple | DE 345678 |  | |
| Food | 000101 | | |
| Green | EF 456789 |  | |
| Mortgage / Rent | 000111 | | |
| Bronze | PQ 012345 |  | |
| Transportation | 001010 | | |
| Brown | RS 098765 |  | |
| Utilities: Telephone | 001101 | | |
| Grey | HJ 123456 |  | |
*Fig. 8*

ACCOUNT NAME: JANE OR JOHN SMITH    ABC BANK
ACCOUNT NUMBER: 12345678            456 MAPLE DRIVE
STATEMENT PERIOD: OCTOBER 01 - 31, 1995    ANY TOWN, USA 10000
STATEMENT DATE: NOVEMBER 01, 1995    (248) 555-1000

| Category | Amount |
|---|---|
| CLOTHING | 70.00 |
| CREDIT CARD | 35.00 |
| DONATIONS | 10.00 |
| EDUCATION | 20.00 |
| FOOD | 210.00 |
| INSURANCE | 5.00 |
| MEDICAL | 60.00 |
| MORTGAGE / RENT | 370.00 |
| RECREATION | 30.00 |
| TAXES | 100.00 |
| TRANSPORTATION | 55.00 |
| UTILITIES: ELECTRIC | 30.00 |
| UTILITIES: GAS | 25.00 |
| UTILITIES: TELEPHONE | 20.00 |
| UTILITIES: WATER | 15.00 |
| MISCELLANEOUS | 50.00 |
| TOTAL | $1,105.00 |

*Fig. 9*

ACCOUNT NAME: JANE OR JOHN SMITH
ACCOUNT NUMBER: 12345678
STATEMENT PERIOD: OCTOBER 01 - 31, 1995
STATEMENT DATE: NOVEMBER 01, 1995

ABC BANK
456 MAPLE DRIVE
ANY TOWN, USA 10000
(248) 555-1000

AUTOMATED, CLASSIFIED EXPENDITURE DATA CARD RECORDING SYSTEM

FIELD OF THE INVENTION

The field of invention relates to the automatic classification and categorization of consumer and business expenditures activated by a unique classification card; this card initializes a transaction terminal only once prior to the first classified sales transaction; subsequently, each input data amount from credit/debit card sales transactions will be classified accordingly; and this categorized amount will be further processed by a credit/debit card issuer, and a data cards system controller via its electronic, computerized interchange network. A detailed report will be available to the cardholder.

GLOSSARY OF TERMS

ABCC (Automatic Budget Credit/Debit Card) is the prospective trademark and trade name of the classification card; denotes the classification card; and represents the identification of expenditure classification system for any form of credit card or debit card sales transactions between two parties for the benefit of an individual or an entity.

ATM is the automated teller machine which gives the consumer 24-hours, 7 days a week availability to basic banking service transactions (deposit, withdrawal, cash advances, transfers) through a ATM debit card with a secret PIN (personal identification number) code. [See debit card.]

Binary Code is a numerical code where the only two possible integers 0 (zero) and 1 (one) are used to form a contiguous non-zero sequence of these two integers for the express purpose of quantification and enumeration.

Cardholder is a consumer who uses a credit card or a debit card to effect a sales transaction.

Cash Register is the merchant's leased/owned electronic terminal device which enters and records the sales transaction between the consumer and the merchant. The terminal internally stores coupons, vouchers, register tape, as well as cash/coin, checks, and credit/debit card sales slips and can be incorporated into the point of sales terminal as one single apparatus. [See point of sales terminal.]

Classification Card is the unique magnetically-encoded, color-coded, plastic card which represents the ABCC expenditure classification system as issued by the manufacturer of point of sales terminals to the merchant. The information from said card may be read/stored/transmitted from a points of sales terminal and/or a data cards system controller.

This classification card's front side has physically embossed in raised lettering: the name of ABCC; the ABCC expenditure classification name and its corresponding logo; the merchant's name, and the validation date of the card. On its reverse side, a place for the merchant's or his representative's authorized signature adjacent to a magnetically-encoded strip which contains: the binary sequential code (or any other numerical systematic code) of a specific ABCC expenditure classification; the merchant's point of sales terminal serial number; and the validation date of said card.

Consumer is the person, entity, corporation who engages in a sales transaction by remitting funds to the merchant for goods or services and other tangible and intangible benefits including charity, clothing, food, transportation, legal/ medical services, entertainment, etc.

Credit Card is the financial transaction instrument, usually of magnetically-encodable plastic, which authorizes a consumer to remit funds to the merchant against a pre-determined, unsecured line of credit; or to obtain cash advances. The credit card serves a dual function: (1) for sales transactions—the consumer presents this card to the merchant in lieu of cash or checks; and (2) for future credit—the consumer can use a credit card as a revolving debt instrument.

On the front side of this card, physically embossed, raised lettering identifies the name of the cardholder and his current account number, expiration date of the account, and the credit card issuer's identification number as predesignated by the data cards system controller. On the reverse side of this card within the magnetic-encoded strip (in binary code or any other numerical systematic code) includes the cardholder's data from the front side along with one's PIN code and his credit card issuer's transit/routing number according to the U.S. Federal Reserve System.

Credit Card Issuer is an institution (who can issue credit cards to the consumer) which includes local banks, state-chartered banks, national banks, thrift institutions, credit union/savings and loan associations, or any other authorized institution. A credit card issuer who is licensed by a data cards system controller can bear its business trademark and utilize its electronic, computerized, interchange network and protocol to process credit card sales transaction. Notwithstanding a credit card issuer independently owns its list cardholders' accounts, determines annual fees, interest rates, grace period, and any penalties, and most importantly evaluates each prospective cardholder's credit limit. [Termed also consumer's bank.]

Data Card can refer to the classification card, or credit card or debit card.

Data Card Issuer can refer to the credit card issuer or debit card issuer.

Data Cards System Controller is the entity that licenses its trademark to the data card issuer and to the merchant for advertising/business purposes; it also licenses a right to the data card issuer and the merchant to use its electronic, computerized database interchange network according to a standard protocol to process any form of credit or debit sales transactions between two parties where the ABCC classification card information can be read, stored and transmitted to the end user. Examples of data cards system controller include MasterCard®, Visa®, Discover®.

Debit Card is the financial transaction, plastic instrument which a bank or brokerage pre-authorizes a consumer to purchase goods and services according to his bank/ brokerage account. Without the credit function of a credit card, a debit card is similar to an electronic checking account; it is also called a ATM card or check guarantee card.

On the debit card's front side is the name of the debit card issuer (and in embossed lettering) the name of the debit cardholder, the account number and its expiration date; on the card's reverse side a space for an authorized signature and within its magnetic encoded strip (in binary code or any other numerical systematic code)—informational data from the front side plus the PIN code and the debit card issuer's transit routing number.

Debit Card Issuer is an institution (who can issue ATM debit cards to the consumer) which includes local/state-chartered/national banks, thrift institutions, credit union/ savings and loan associations, or any other authorized institution. A debit card issuer who is licensed by a data cards system controller can bear its business trademark and utilize its interchange, computerized database network and protocol to process debit card sales transaction; but similar to a credit card issuer, it independently owns its list of cardholders' accounts. [Termed also consumer's bank.]

Identification Color is the unique color of the classification card which can be differentiated by human sight, representing a specific category of expenditures as determined from time to time by a consortium of all concerned parties.

Magnetic Encoded Strip is the physical substrate comprised of a ferrous/ferric oxide coating on the reverse side of a data card. A data card encoder permanently alters the magnetic field on one or more of its magnetic tracks [according to the International Standards Organization (ISO) standard, specifications standards for magnetic strip encoding] into a unique, predefined sequential binary code (or any other numerical systematic code) identifying the cardholder, the data card issuer, and any other necessary information.

MICR is a process known as magnetic ink character recognition by a machine or computer.

Merchant is the individual, organization, company, or corporation which provides goods and services to the consumer and receives funds in connection with a sales transaction from the consumer in the form of credit/debit charges, legal tender, or check. For any sales transaction, the merchant utilizes his cash registers/point of sales terminals. The merchant may employ sales clerk(s) to assist in the sales transaction.

PIN is the personal identification number, secret code issued by the data card issuer to the cardholder, or personally selected by the cardholder; is used only by the cardholder for business, financial, banking, or sales transactions between two parties concurrently with a data card.

Point of Sales Terminal is the merchant's leased/owned electronic terminal/system which reflects and records the sales transactions between consumer and merchant. Similar to the cash register terminal, the point of sales terminal accepts legal tender, checks, and credit/debit charges as payments for sales transactions. For credit/debit sales transaction, a magnetic card reader reads data from the consumer's credit/debit card, a telecommunications device, dial-up modem set to interact with the consumer's credit/debit card issuer, and the data card system controller; and a printer prints sales transaction receipts and slips. Input of the new ABCC classification card information can be read and/or stored.

Sales Transaction is the human activity between the consumer and the merchant, exchanging the merchant's goods and services for the consumer's monetary means via: a pre-authorized credit/debit card limit; legal tender as issued and printed by the treasury department of any given country; or a personal check issued and cleared by the consumer's bank. The sales transaction—typically recorded on the sales receipt and/or the credit/debit card sales slip—can occur person to person, through mail ordering, or by telecommunications (via telephone, facsimile, or computer auto-modem, or any other medium).

Telecomm chain is the telecommunications means of exchanging information between and among two or more individuals, institutions, or entities. This dialogue of open exchange of information can occur anywhere, at any time by telephone, facsimile, telegraph, auto-answering computer modem, electronic mail—America-On-Line, Compuserve, Internet, Prodigy—through the means of microwave links, telephone lines, optical fibers, and any other technology now or hereinafter in existence.

DESCRIPTION OF PRIOR ART

CREDIT CARDS:

U.S. Pat. No. 4,179,139 to Savar (1979) sets forth a preprinted form which embodies on one side a standard bank check, and on the other side a standard credit card sales slip.

U.S. Pat. No. 4,522,670 to Caines (1985) sets forth the process to manufacture an amorphous polyester, tamper-resistant data card.

U.S. Pat. No. 4,557,963 to Caines (1985) sets forth an amorphous polyester data card which contains embossed lettering which is tamper-resistant.

CREDIT CARD SYSTEMS:

U.S. Pat. No. 4,172,552 to Case et al. (1979) sets forth a credit card processing system which integrates a magnetic data card reader, then imprints said data in MICR format on the credit card sales slip, then designates the sales transaction to either Electronic Data Processing (EDP) or Electronic Funds Transfer (EFT).

U.S. Pat. No. 4,700,055 to Kashkashian, Jr. (1987) sets forth a credit card system which enables a cardholder to use a multi-indexed credit card instead of multiple credit cards. More specifically, only one magnetically-encoded credit card would index essential data regarding each valid credit cardholder to be accessed by either a microprocessor system or central database computer.

U.S. Pat. No. 5,241,600 to Hillis (1993) sets forth a verification of credit cards or identification cards employing an image embossed or laminated onto the card, and essential data would be stored on its magnetic-encoded strip.

U.S. Pat. No. 5,334,823 to Noblett, Jr. et al. (1994) sets forth a comprehensive operational system of data card terminals which includes: a credit card transaction terminal with an embossed character reader, a magnetic strip reader, and a signature capturing printer such that the entire transaction data is communicated to the host computer system of a transaction processor which then confirms the sales transaction as chargeback-protected to the merchant in certain circumstances.

U.S. Pat. No. 5,352,876 to Watanabe et al. (1994) sets forth a credit card sales transaction system which utilizes both a credit card and an identification card within a prepaid vending machine.

U.S. Pat. No. 5,355,411 to MacDonald (1994) sets forth another credit card verification system similar to U.S. Pat. No. 5,241,600 to Hillis (1993); both the cardholder's signature and photo image are digitized by scanning, compressed, and magnetically encoded onto the credit card's magnetic strip for enhanced security during sales transactions.

U.S. Pat. No. 5,384,449 to Peirce (1995) sets forth an authorization matching system for credit card transaction systems using the same identification number with each authorized transaction.

MAGNETIC/MICR:

U.S. Pat. No. 4,100,011 to Foote (1978) sets forth a process to manufacture a thermoplastic, surface laminate layer, magnetically-encodable strip data card.

U.S. Pat. No. 5,019,696 to Chang (1991) sets forth a system and mechanism of detecting, converting, decoding and reconstructing magnetic data from a standard credit card.

POINT OF SALES SYSTEMS:

U.S. Pat. No. 4,722,054 to Yorozu et al. (1988) sets forth an a consumer-based information input system from a multitude of points of sales terminals which can receive, process, and transmit sales transaction data.

U.S. Pat. No. 5,119,294 to Tanaka (1992) sets forth a sales transaction processing systems including a multitude of point of sales terminals, a group management device of point of sales terminals, and a sales management device with the express purpose of increasing efficiency of processing sales transaction data.

U.S. Pat. No. 5,256,863 to Ferguson et al. (1993) sets forth an automated data acquisition and processing system at the point of sales transaction which integrates two local area networks of point of sales terminals into a universal controller system.

ACCOUNTING SYSTEMS:

U.S. Pat. No. 3,980,323 to Boyreau (1976) sets forth a system for manually preparing and preserving tax records by manually crossing out a numbered box whose expenditure category is referenced on a separate check register.

U.S. Pat. No. 4,400,017 to Pendergrass (1983) sets forth a manually prepared, monthly checkbook register for recording budget items and accounting data system.

U.S. Pat. No. 5,193,055 to Brown et al. (1993) sets forth an accounting system using a pre-established category codes and the entry of data by the consumer to be further processed through a service company.

DESCRIPTION OF DRAWINGS

FIG. 7 is the detailed chart of the ABCC expenditure classification, binary-encoded, color-coded ABCC classification cards, and point of sales serial terminal numbers.

FIG. 8 is the sample of the ABCC expenditure classification, binary-encoded, color-coded ABCC classification cards with corresponding pictographic icons.

FIG. 9 is the bar chart representing the monthly ABCC expenditure classification system in absolute dollars.

BACKGROUND OF INVENTION: PRIOR ART, PART ONE

Figure 1A:
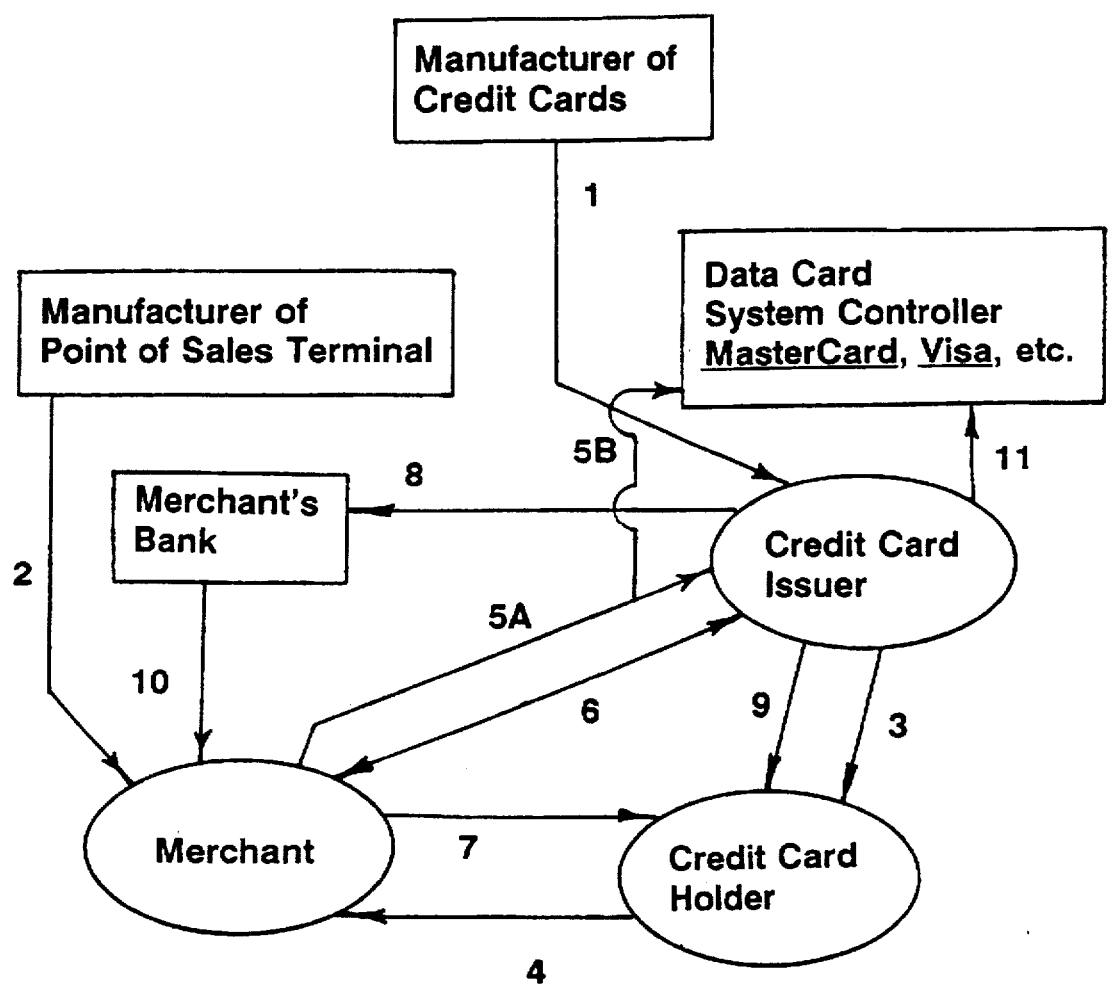
FIG. 1A is the flow chart of the present credit card system.

CREDIT CARDS:

U.S. Pat. No. 4,179,139 to Savar (1979) describes a duo, preprinted form: a conventional bank check, and a conventional credit card sales slip; but, neither format categorizes the expenditure for the consumer at the point of sales transaction; moreover, neither form extends beyond the basic transaction information—date/time, description, and monetary amount.

U.S. Pat. No. 4,522,670 to Caines (1985) details the technical process to manufacture an amorphous polyester, tamper-resistant data card; and U.S. Pat. No. 4,557,963 to Caines (1985) describes said respective data card; however, both are indexed here as examples.

CREDIT CARD SYSTEMS:

U.S. Pat. No. 4,172,552 to Case et al. (1979) details a credit card transaction system incorporating an imprinted MICR code (date, credit or charge, electronic data processing or electronic funds transfer) onto the credit card sales slip; however, this process of encoding the information inconveniences the merchant and increases his business costs, while simultaneously benefiting the financial institution's data processing system by decreasing its labor costs.

U.S. Pat. No. 4,700,055 to Kashkashian, Jr. (1987) describes one unique magnetically encoded credit card which is indexed to a multitude of individual credit card accounts; but, the responsibility rests on the consumer to memorize which account is which and to absolutely guard this special card from theft or unauthorized use.

U.S. Pat. No. 5,241,600 to Hillis (1993) details an image-embossed, verification system for credit cards/identification cards; on the other hand, this identity verification system assures the merchant from accepting an unauthorized user prior to initiating a sales transaction.

U.S. Pat. No. 5,334,823 to Noblett, Jr. et al. (1994) describes a credit card operational method which encompasses a whole series of integrated, input/output, computerized devices; but, this system mainly protects the merchant after the sales transaction from being charged back (credited) to his bank account.

U.S. Pat. No. 5,352,876 to Watanabe et al. (1994) states a prepaid vending machine sales transaction system which debits a pre-authorized amount from the magnetic-encoded credit card, while crediting the same amount onto the magnetic-encoded identification card; nevertheless, this may pose a minor inconvenience to the consumer who then needs to simultaneously carry and use two credit/debit cards to purchase a snack, soda, or candy bar.

U.S. Pat. No. 5,355,411 to MacDonald (1994) states another document verification system for credit cards/identification cards by magnetically encoding the cardholder's like image and signature for comparison at the point of sales transaction; however, this system again benefits the merchant from permitting unauthorized usage during a sales transaction between consumer and merchant.

U.S. Pat. No. 5,384,449 to Peirce (1995) details an identical, alpha-numerical code which together matches authorization records and transaction records; but, this favors both the merchant's and the credit card issuer's financial data processing systems at each consumer's sales transaction.

MAGNETIC/MICR:

U.S. Pat. No. 4,100,011 to Foote (1978) describes a process to manufacture a surface thermoplastic, laminate layer, magnetically-encodable strip data card; U.S. Pat. No. 5,019,696 to Chang (1991) details a system and mechanism of detecting, converting, decoding and reconstructing magnetic data from a standard data card; but again, both are referenced here only as cited examples.

POINT OF SALES SYSTEMS:

U.S. Pat. No. 4,722,054 to Yorozu et al. (1988) states a consumer-oriented, data input system for a series of merchant's points of sales terminals; though this system increases the efficiency of concurrent credit card sales transactions between consumer and merchant but the information scanned and read is standard—for example, personal identification number codes from the magnetic strip of the credit cards.

U.S. Pat. No. 5,119,294 to Tanaka (1992) details a credit card sales transaction processing system of interconnected, managed point of sales terminals; but, this mainly benefits the merchant's internal data processing between his point of sales terminals and the consumer's credit card issuer.

U.S. Pat. No. 5,256,863 to Ferguson et al. (1993) states another credit card sales transaction processing system incorporating a dual local area networks of point of sales terminals into a universal controller system; but again, this benefits the merchant's internal data processing between his business and the consumer's credit card issuer through the electronic interchange network.

ACCOUNTING SYSTEMS:

U.S. Pat. No. 3,980,323 to Boyreau (1976) describes a manual system of classifying expenditures for tax purposes with a physical mark on the face of the check, but without the use of the consumer's internalized bank data processing.

U.S. Pat. No. 4,400,017 to Pendergrass (1983) also describes another purely manual systems of classifying check expenditures and budget entries. But again, these two manual systems do so without the benefit of the financial institution's computerized data processing.

Finally, U.S. Pat. No. 5,193,055 to Brown et al. (1993) is an accounting system for consumer households and small businesses. This overall system of data processing for accounting purposes has limited advantages here. The consumer (payer) must rely on a storage medium other than the check or sales receipt itself to recall and record various numerical codes assigned to pre-classified expenditures.

All of the above-mentioned prior art have set limitations: (1) they appear to be neither sufficiently convenient for the consumer, nor user friendly; (2) they benefit the merchant's internal security systems or his internal transaction processing system; (3) they benefit the data card issuer's internal transaction processing system via its interchange network; and (4) they favors the financial institution's data processing system; and (5) they (cited as examples only) show a magnetic data encoding process, a payment function and/or a credit function for a credit/debit card. Consequently, the above-referenced may be labor intensive; neither time-saving, nor economically feasible, nor resourceful; or any combination of reasons thereof for any party to implement and to continue usage.

BACKGROUND OF INVENTION: DISCUSSION,
PART TWO

According to 1995 Credit Card Issuers Guide and 1995 EFT Network Data, United States credit card executed transactions totaled 474.3 billion dollars processed per 5.60 billion transactions. Even more outstanding is the respective debit card figures: 485.5 billion dollars per 8.3 billion transactions. Furthermore, growth figures of the global charge volume astound the imagination: over a ten year period (1984 to 1994) it increased from 201.0 billion dollars to 959.8 billion dollars (approaching one trillion), a phenomenal increase of 377.51%, over a three-fold leap!

Checks, ATM cards, and coin/paper currency form the basis of the money triangle as defined by the recent 1994 Annual Board of Governors Report of the U.S. Federal Reserve System; but this triangle can certainly be reconfigured into a quadrant when Electronic Funds Transfer systems enter into this economic formation.

The major infrastructure of the credit/debit card transactions involves three major components: the merchant or professional providing the goods and services to the consumer; the data communications link between the merchant's retail establishment to the information processing center of the interchange network; and the central computer which has the auto-answer modem bank and the credit/debit database representing all valid credit/debit cardholders within this interchange network.

No doubt, credit and debit cards have approached a universal acceptance and have presented themselves as purveyors of convenience and portability. Typical credit/debit card issuers include: automotive, retail goods, airlines, fuel/gasoline, financial service institutions such as brokerage houses. Data cards system controllers include Master Card®, Visa®, and Discover®. Note that American Express®, for instance, is neither a credit nor a debit card, but a travel/entertainment charge card which requires the cardholder to pay each monthly balance in full. Thus as stated earlier, the convenience and the necessity of using the credit/debit card which associates the cardholder to a legal signature, a maximum credit/debit limit, and an expiration date of the account number.

Yet there is a missing factor; that is the classification of credit/debit card sales transactions. Each period the cardholder sees volumes of data upon receipt of the monthly statement: data that tells the date, the time, a brief description, and the amount of all transactions. Each transaction is in chronological order, each transaction fulfills a need or a desire, but the individual still does not have the what . . . what each sales transaction is categorized into broad, consumer/business expenditure classifications over any given period. One can not examine without additional great effort, nor forecast overall credit/debit card sales transactions spending pattern and trends.

The answer for what is here!

A closer examination ensues regarding the present credit card systems.

[FIG. 1A]

[Step 1] The manufacturer of credit cards delivers to the credit card issuer a set of blank cards, ready to be magnetically-encoded to prospective cardholders.

[Step 2] Meanwhile, the manufacturer of point of sales equipment delivers to the merchant either leased or purchased point of sales terminals with serial numbers.

[Step 3] The consumer requests for a credit line from the credit card issuer. Once the consumer is approved for a maximum credit line and is assigned an account number, the credit card issuer magnetically encodes the necessary information regarding the prospective cardholder onto the blank credit card. Upon receiving the credit card, signing the reverse side of his card, and contacting the credit card issuer to activate his new account, the consumer becomes an authorized credit cardholder.

[Step 4] With the credit card, the consumer shops at the store, browses through the mail-order catalog, dials a toll-free 800 telephone number for products or services, decides to purchase the services or goods of a merchant who is authorized by the data card system controller to accept credit cards as payment for said services or goods.

[Step 5A] Through the cash register/point of sales terminal, the merchant records the sales transaction information on a sales receipt which includes: the name, address, telephone number of the merchant; date and time; the purchased product or rendered service and identification number, if any; the subtotal; any applicable taxes or tips; the total; how funds for the sales transaction are to be tendered; and any change due.

[Step 5B] The consumer may remit funds with cash or by check. But if the consumer elects to use a credit card for the sales transaction, then the cardholder proceeds to give his card to the merchant. Or if the sales transaction is conducted over the telephone, then the consumer will furnish the info about his credit card: the data cards system controller, complete name, account number, and expiration date of the credit card.

Continuing, the merchant uses a data telecommunications device adjacent to the point of sales terminal—typically a dial-up, asynchronous or synchronous modem—to establish a data communications link among the merchant's point of sales terminal serial number, the credit card issuer, and the data cards system controller through the interchange network. This connection remains on-line only until the consumer's credit card issuer authorizes the sales transaction between the consumer and merchant. Note that the panel signal of an on-line LED (light emitted diode) display and the high-pitched audible sound from the telephone means that the dial-up modem at the merchant's place is attempting to communicate to the data cards system controller's modem.

[Step 6] Once the data communications link is established between the merchant's point of sales terminal and the cardholder's credit card issuer via this interchange network, and if the consumer is physically present at the merchant's premises, a person will then proceed to manually slide or swipe his credit card in a linear, uniform motion through the merchant's point of sales terminal. In the event the point of sales terminal does not have the capability to input the credit card data from the cardholder, the merchant may manually use an embossed card reader to swipe or to slide over the credit card and the credit card sales slip, and simultaneously telephones for a verbal authorization from the credit card issuer through this same interchange network.

The merchant's point of sales terminal then communicates over the data communications link the following sales transaction information: credit cardholder's name and account number; expiration date of the account; the merchant's identification number; date and time of sale; the intended purchase or rendered service; and the total amount tendered as entered by keyboard or keypad action. This important information is then received and processed by the cardholder's credit card issuer for verification of the cardholder's identity and validation of his purchase—that the total amount tendered does not exceed his current credit limit. Once these conditions are met as shown the LED display panel of the point of sales terminal, the credit card issuer authorizes credit toward the purchase of goods and services.

[Step 7] Should the credit be denied, then the merchant does not deliver the goods and services; and the credit card is returned to the consumer. However, should the credit be approved the credit card issuer validates the sales transaction; the cash register/point of sales terminal prints a sales receipt and/or a credit card sales slip (which also serves as an invoice) with the following information regarding the sales transaction: the name, address, and telephone of the merchant; the sales clerk identification number; the merchant's cash register/point of sales terminal serial number; the date and time; cardholder's account number; description of goods and services; total amount including any applicable taxes and tips; the sales authorization number; and the cardholder's signature.

Once the signature is executed on the credit card sales slip, then the merchant visually matches the signature on the credit card sales slip with that on the reverse side of the credit card; and the sales transaction is completed. (If there is any major discrepancy between the two signatures, then a further verification system occurs among the consumer, merchant and his sales clerk. One copy of the sales transaction is retained for the merchant's accounting and billing; and the other copy is retained for the credit cardholder's personal records; and finally, the goods and services merchandise is delivered to the cardholder.

[Step 8] Prior to the end of the billing cycle: the merchant has deposited the credit card sales slip into his bank; simultaneously through the interchange network, the merchant's bank presents the credit card sales transaction for payment-on-demand to the cardholder's credit card issuer, and immediately the cardholder's credit card issuer settles the outstanding account with the merchant's bank by electronic funds transfer, less a service fee from 1% to 2%.

[Step 9] At the end of this billing cycle, the credit card issuer creates a detailed sales transaction report for each cardholder. This report comprises all the sales transaction activity for the period beginning and period ending. Typical items found on the individual monthly report include: date of sales transaction; actual posting date; an internal reference number indexing the point of sales transaction; the store or retail establishment where the sales transaction occurred; the total amount tendered during the sales transaction; and an account summary—previous balance, purchases, cash advances, credits, payments, other charges, finance charges, and new balance. Then the credit cardholder pays his credit card issuer the entire or partial balance due by cash, check, by electronic funds transfer, or perhaps with another credit card.

[Step 10] Concurrently with Step 8, the merchant's bank periodically creates a detailed, credit card sales transaction report for each merchant, confirming the electronic funds transfer payments from the consumer's credit card issuer, less a service fee from 1% to 6% based on total sales.

[Step 11] Concurrently with Step 9, the credit card issuer transmits a pre-negotiated licensing fee to the data cards system controller.

Figure 1B:
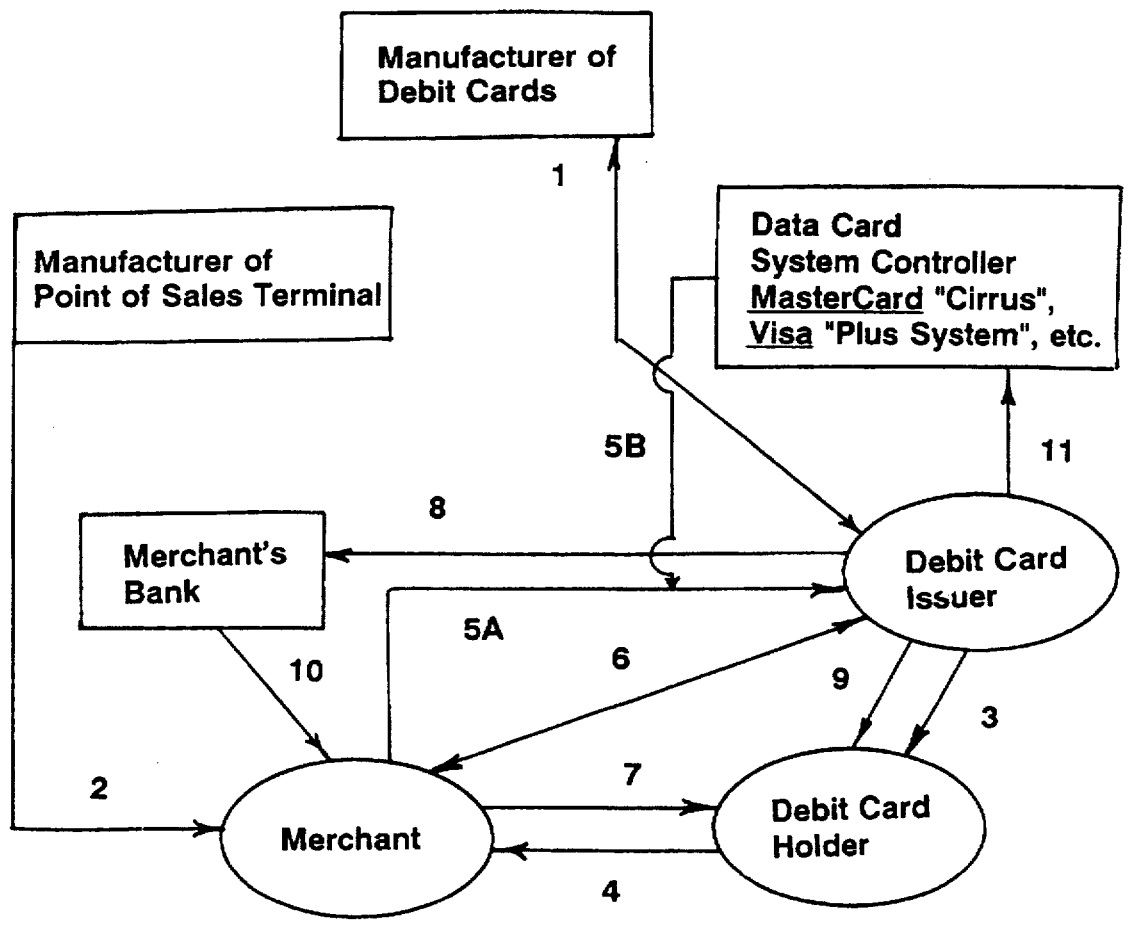
FIG. 1B is the flow chart of the present debit card system.
Figure 2:
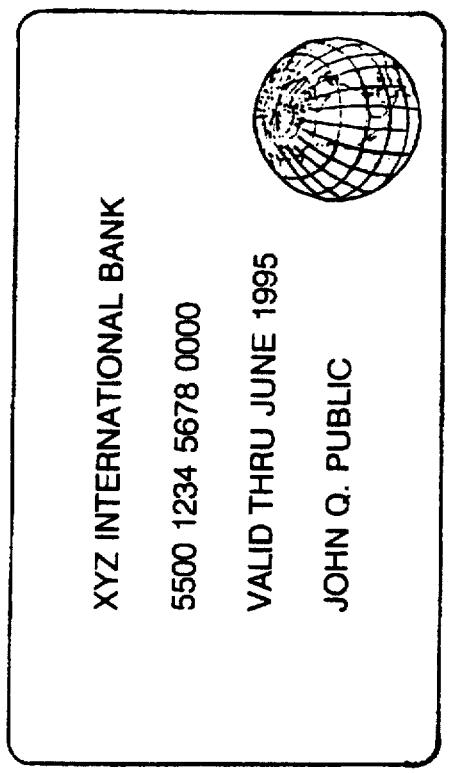
FIG. 2 is the front side of a credit/debit card.
Figure 3A:
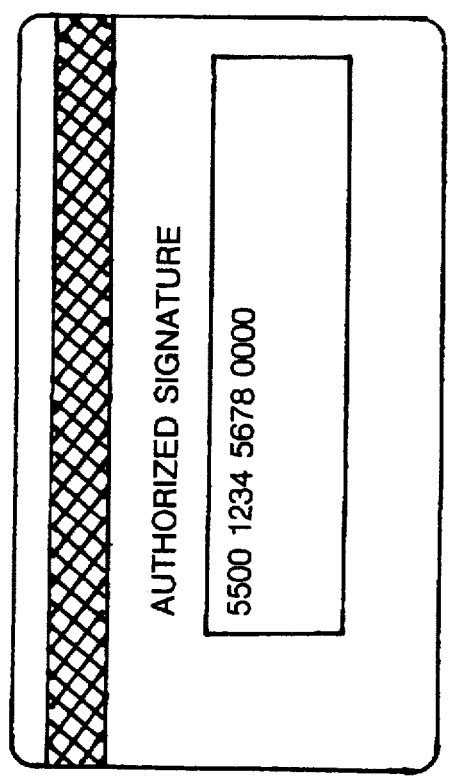
FIG. 3A is the reverse side of a credit/debit card.
Figure 3B:
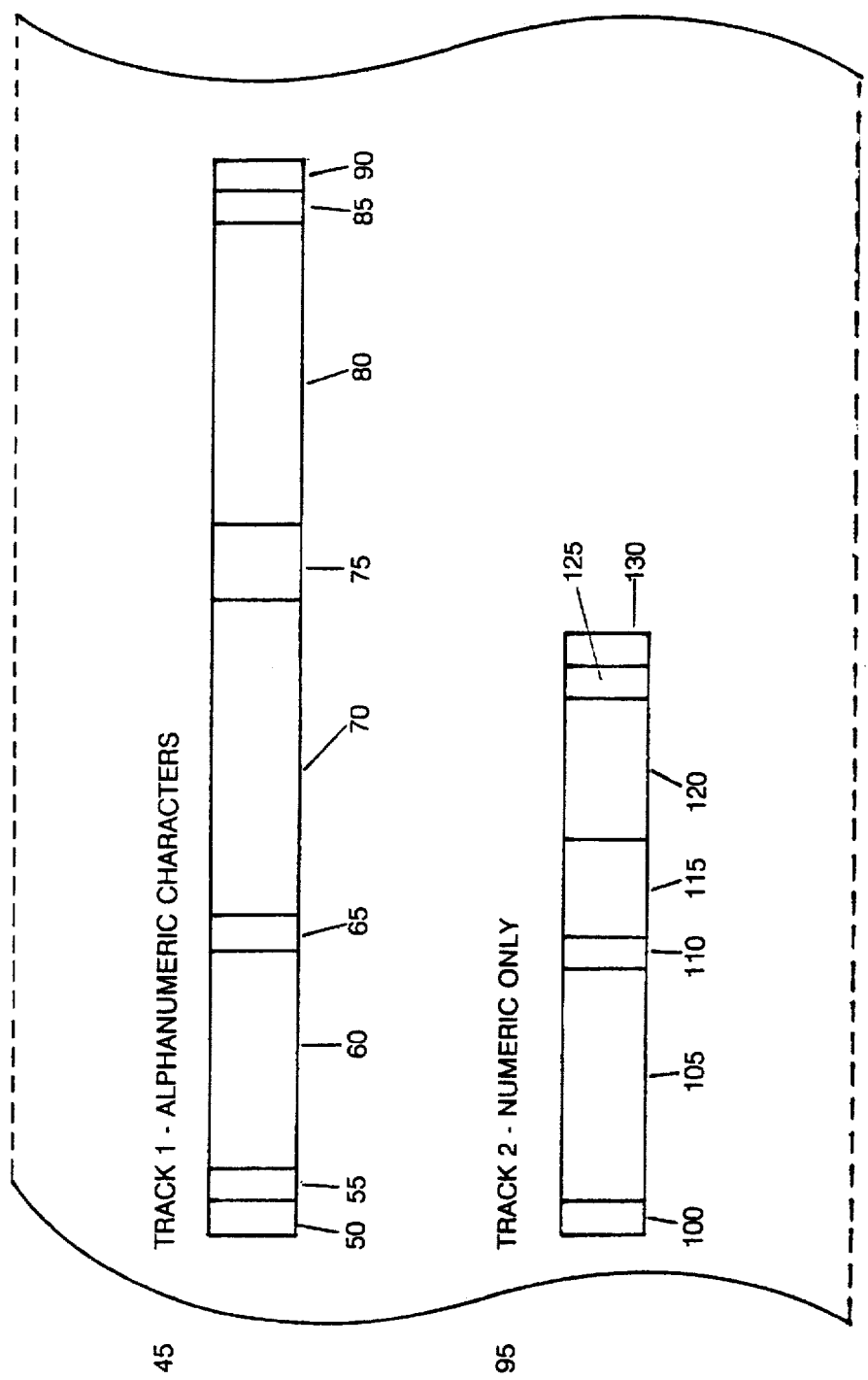
FIG. 3B is the magnetic strip arrangement from the reverse side of a credit/debit card.

Focus on the present debit card systems now.
[FIG. 1B]

[Step 1] The manufacturer of debit cards delivers to the debit card issuer a set of blank cards, ready to be magnetically-encoded to prospective cardholders.

[Step 2] Meanwhile, the manufacturer of point of sales equipment delivers to the merchant point of sales terminals (either leased or purchased) with serial numbers.

[Step 3] The consumer establishes a bank or brokerage account (regular checking or asset management) from his debit card issuer. Since the bank/brokerage account does not extend a personal line of credit but acts like an electronic checking account, the financial institution can immediately authorize, assign, and magnetically encode an account number/PIN code onto a debit card to a consumer who has a history of excellent credit and who does not habitually issue insufficient checks. Upon receipt, the consumer memorizes the PIN code and signs on the signature line on the reverse side.

[Step 4] With the debit card, the consumer shops at the store, looks through the mail-order catalog, dials a toll free telephone number to reserve a rental car, or obtains the services or goods from a merchant who is authorized by the data card system controller to accept debit cards as payment for said services or goods.

[Step 5A] Through the cash register/point of sales terminal, the merchant records the sales transaction information on a sales receipt which usually includes: the name, address, telephone number of the merchant; date and time; the purchased product or rendered service and identification number, if any; the subtotal; any applicable taxes or tips: the total; how the sales transaction is to be tendered; and any change due.

[Step 5B] The consumer may remit funds with cash or by check. But, if the consumer elects to use a debit card for this sales transaction, then the cardholder proceeds to give this card to the merchant. Or if the sales transaction is conducted over the telephone, then the consumer will furnish data regarding the debit card to the merchant: the choice of a data cards system controller, complete name, account number, and expiration date of the account.

Currently MasterDebit®, and Visa Debit® cards are off-line debit cards which like a personal check there is up to a three business day floating period, before the sales transaction receipt slip arrives to the debit card issuer to be processed.

Nevertheless as the future unfolds regarding these debit cards will have the on-line function similar to the present credit card system (as earlier discussed in FIG. 1A) through the telecomm chain using MasterCard® Cirrus or Visa® Plus System, examples of systems controllers. Any future purchase of goods and services will be instantaneously credited from the consumer's bank account and debited to the merchant's bank account with absolutely no intangible floating period. No doubt that this would infinitely please the merchant, since his bank account would immediately record the sales transaction amount.

[Step 6] The merchant uses an embossed card reader to slide or to swipe over the debit card and the sales transaction slip and contacts the debit card issuer for a verbal authorization via the interchange network.

[Step 7] If the sales transaction is approved, the debit card issuer validates the sales transaction, the cash register/point of sales terminal prints a sales receipt and/or a debit card sales transaction slip with the following information: the merchant's name, address, and telephone; the sales clerk identification number; the merchant's cash register/point of sales terminal serial number; the date and time; the cardholder's account number; description of goods and services; total amount including any applicable taxes and tips; the sales authorization number; and the cardholder's signature.

Once the signature is executed on the sales slip, then the merchant visually matches the signature on the debit card sales slip with that on the reverse side of the debit card; then the sales transaction is completed. (If there is any question regarding the authenticity between the two signatures, the further verification process occurs.) One copy of the sales transaction is retained for the merchant's accounting and billing department for further transaction processing; and the other copy is retained for the cardholder's personal records, and receives the products or services.

[Step 8] Prior to the end of the billing cycle: the merchant has deposited the debit card transaction sales slip into his bank to be processed. Simultaneously through the electronic database interchange network of MasterCard® Cirrus or Visa® Plus System, the merchant's bank presents the debit card transaction slip for payment-on-demand to the consumer's debit card issuer; and immediately the consumer's debit card issuer settles the outstanding account with the merchant's bank by electronic funds transfer, less a service fee.

[Step 9] At the end of this billing cycle, the debit card issuer creates a detailed summary report to each cardholder. This report comprises all the financial transaction activity: dates and descriptions of financial transactions and their respective amounts (deposits, withdrawals, cash advances, any earned interest; previous and present balances; and any service fees and charges). If the consumer has more than one account with a bank or brokerage firm, this information can be incorporated into one statement—namely, any passbook savings, money market accounts, and/or checking account activities for that period.

[Step 10] Concurrently with Step 8, the merchant's bank periodically creates a detailed, transaction summary report for each merchant, confirming the electronic funds transfer payments from the consumer's debit card issuer, less a service fee.

[Step 11] Concurrently with Step 9, the consumer's debit card issuer transmits a pre-negotiated licensing fee to MasterCard Cirrus® or Visa® Plus System, or a similar data card system controller.

[FIG. 2]

On the front side of the credit/debit card, physically-embossed, raised lettering identifies the following: the name of the cardholder 20 and his current account number 10, the expiration date of his account number 15.

Also imprinted on the front of the credit/debit card is the name of the credit/debit card issuer 05 and the name of a data cards system controller.

[FIG. 3A]

On the reverse side of the credit/debit card is the following: the magnetic-encoded strip 25, the cardholder's current account number 35, and the place for the authorized cardholder's inked signature 30/40.

[FIG. 3B]

Within this magnetic-encoded strip comprises the following on either track one 45 (in alpha-numeric characters) or track two 95 (numeric only) the following major components/fields: start sentinel 50/100; format code 55; a series of field separators 65/110; any discretionary data 80/120; an end sentinel 85/125; and a longitudinal redundancy check (LRC) region 90/130.

In between the start sentinel 50/100 and end sentinel 85/125 is the following data: the name of the cardholder 70; his current account number 60/105 as well as his PIN code 80/120; the expiration date of his account 75/115; and his credit/debit card issuer's bank transit/routing number according to the U.S. Federal Reserve System 80/120.

EMBODIMENT OF THE INVENTION AND THE UNIQUE ADVANCEMENT FROM PRIOR ART

The prior art of credit/debit card systems and methodology usually ends with FIG. 1A and FIG. 1B at Step 11, with no concrete evidence of where the consumer's prior monies were allocated. There is no creative, universal methodology which allows the credit/debit cardholder to automatically his monthly credit/debit card sales transactions by expenditure classification—clothing, entertainment, childcare, medical, childcare, utilities. The novelty of this invention occurs at FIG. 4 in commencement with FIG. 1A at Step 1, and FIG. 1B at Step 1.

[FIG. 4]

[Step 12] The manufacturer of plastic data cards delivers to the manufacturer of point of sales equipment one or more ABCC color-coded, classification cards, ready to be magnetically-encoded on its magnetic strip and registered to the merchant's authorized point of sales terminal serial number.

[Step 13A] In the event the manufacturer of point of sales equipment delivers a new point of sales terminal to the merchant who will receive a corresponding new ABCC classification card terminal.

[Step 13B] However, if the point of sales terminal is existing, and is operational at the merchant's business, the merchant will request and receive a new ABCC classification card corresponds to the terminal's serial number.

[Step 14A] When the merchant receives the new point of sales terminal with its attached, magnetically- and color-coded ABCC classification card or a ABCC classification card for his designated currently operating terminal, the merchant typically uses a dial-up asynchronous or synchronous modem—to establish a data communications link among the merchant's point of sales terminal serial number, the credit/debit card issuer, the data cards system controller through the electronic, computerized interchange network. This telecommunications connection only remains on-line until the credit/debit card issuer acknowledges the information from this magnetically- and color-coded ABCC classification card.

[Step 14B] Henceforth, the data communications link is established among three parties: the merchant's point of sales terminal serial number, the credit/debit card issuer, the data cards system controller, the merchant will then manually slide or swipe this new ABCC classification card in a linear, uniform motion through the magnetic card reader within or nearby the merchant's point of sales terminal.

Figure 4:
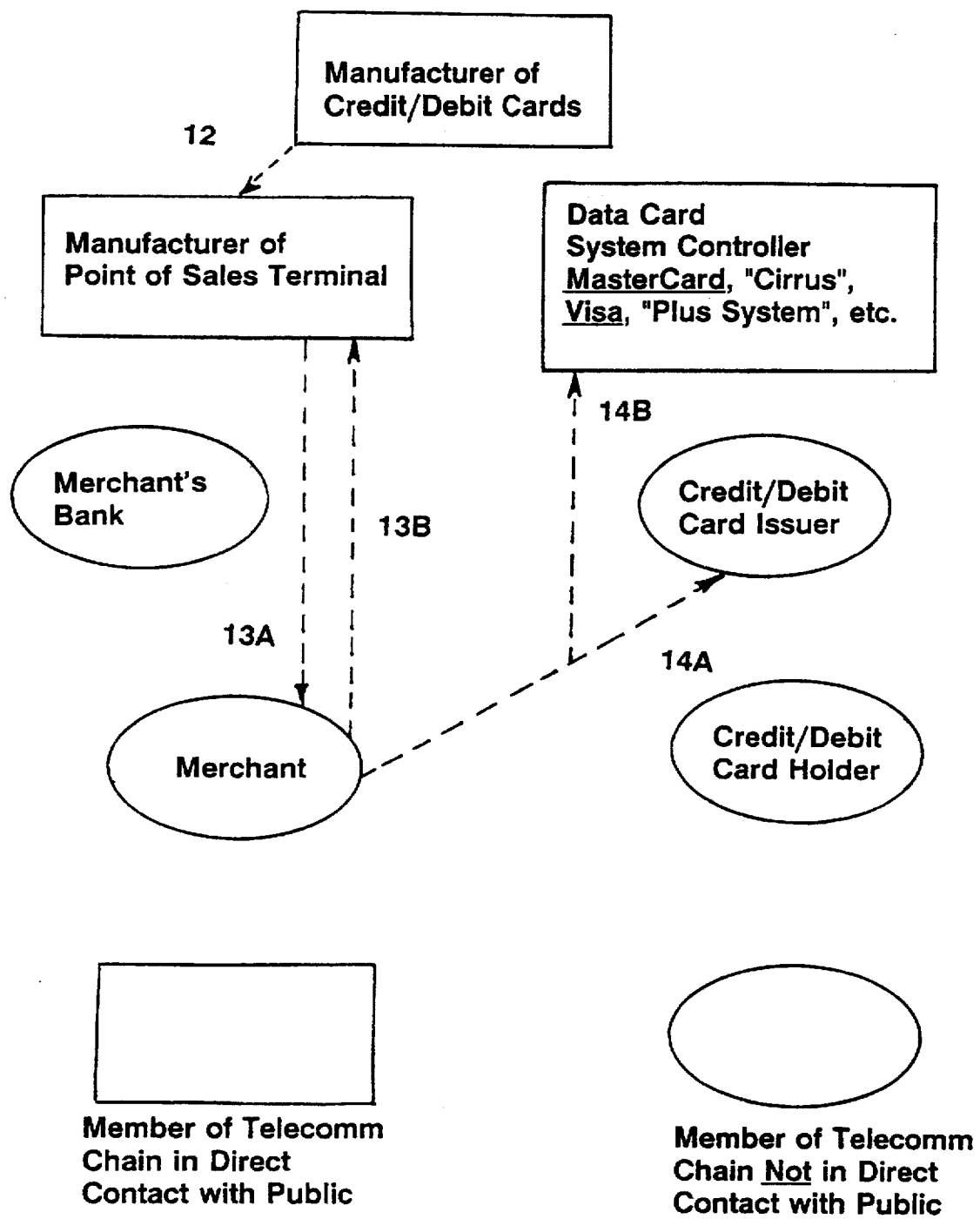
FIG. 4 is the flow chart of the proposed credit/debit card systems, merging the ABCC expenditure classification system.
Figures 5, 6A:
FIG. 5 is the front side of the ABCC classification card.
FIG. 6A is the reverse side of the ABCC classification card.

Once the point of sales terminal is initialized and activated according to the above-mentioned operation, all subsequent sales transactions are automatically identified, recorded, and transferred under a specific ABCC expenditure classification via the dial-up modem. All standard operating procedures for all credit/debit card sales transactions continue as described under FIG. 1A at Step 4 and FIG. 1B at Step 4, respectively. The merchant's point of sales terminal serial number is now set to automatically record each sales transaction under a ABCC expenditure classification, and Steps 13B through 14B of FIG. 4 are unnecessary.

[FIG. 5]

On the front side of this ABCC classification card, physically embossed, raised lettering is the following: the ABCC expenditure classification 135; a corresponding logo of that expenditure classification 155; the name of the merchant 145; the validation date of his account 150; and the point of sales terminal serial number 140/170. For visual identification only, this card is color-coded to only one specific ABCC expenditure classification.

[FIG. 6A]

On the reverse side of this ABCC color-coded, classification card is the following: the magnetic-encoded strip 160 and the place for the authorized merchant's signature or his representative's 165/175.

[FIG. 6B]

Within the magnetic-encoded strip of this ABCC color-coded, classification card comprises the following on track two 180 (binary codes or any other numerical systematic code) the following major components and fields: start sentinel 185; a field separator 195; an end sentinel 210; and a longitudinal redundancy check (LRC) region 215. In between the start sentinel 185 and end sentinel 210 of track two is the following: the corresponding binary code of the ABCC expenditure classification 205; the merchant's point of sales terminal serial number 190; and the validation date of his account 200.

[FIG. 7, FIG. 8]

For example, the binary sequential numbered 000101, green color-coded, ABCC classification card as indexed to the merchant's point of sales terminal serial number EF 456789 will reflect all sales transactions under the expenditure classification of FOOD. Then during the sales transaction between the consumer and merchant, when the data communications link has been established—the amount is tendered; both credit/debit cardholders and retail store identities are verified; and the point of sales terminal is on-line with the credit/debit card issuer's database through a data cards system controller's network. All sales transactions from this initialized terminal will only transcribe exactly one expenditure classification, namely FOOD.

However, if the merchant changes his product line of goods and services to another ABCC expenditure classification, i.e., clothing, he again simply slides or swipes this same point of sales terminal with a different ABCC classification card. All subsequent sales transactions from his same point of sales terminal serial number will read and record a different ABCC expenditure classification. For example, the binary sequential numbered 000010, medium purple color-coded, ABCC classification card as re-indexed to the same merchant's point of sales terminal serial number EF 456789 will now transcribe all sales transactions under the expenditure classification, CLOTHING.

In summary, the new ABCC classification card activates the new ABCC expenditure classification system by the merchant manually sliding or swiping this unique card through a magnetic card reader which will only read the magnetically, binary-encoded (or its numerically systematic equivalent) data of one specific, ABCC expenditure classification, prior to the very first classified sales transaction to be categorized under the ABCC expenditure classification system. The merchant's point of sales terminal is all set to automatically record all credit/debit card sales transactions under a ABCC expenditure classification, until the merchant decides to expand into a different market. When the merchant is set to change, he simply slides or swipes a different ABCC binary-encoded, color-coded, classification card through his magnetic card reader at the point of sales terminal. All subsequent sales transaction from this reclassified and reinitialized point of sales terminal will immediately record and reflect a different ABCC expenditure classification.

ALTERNATIVE EMBODIMENT OF THE INVENTION

Figure 6B:
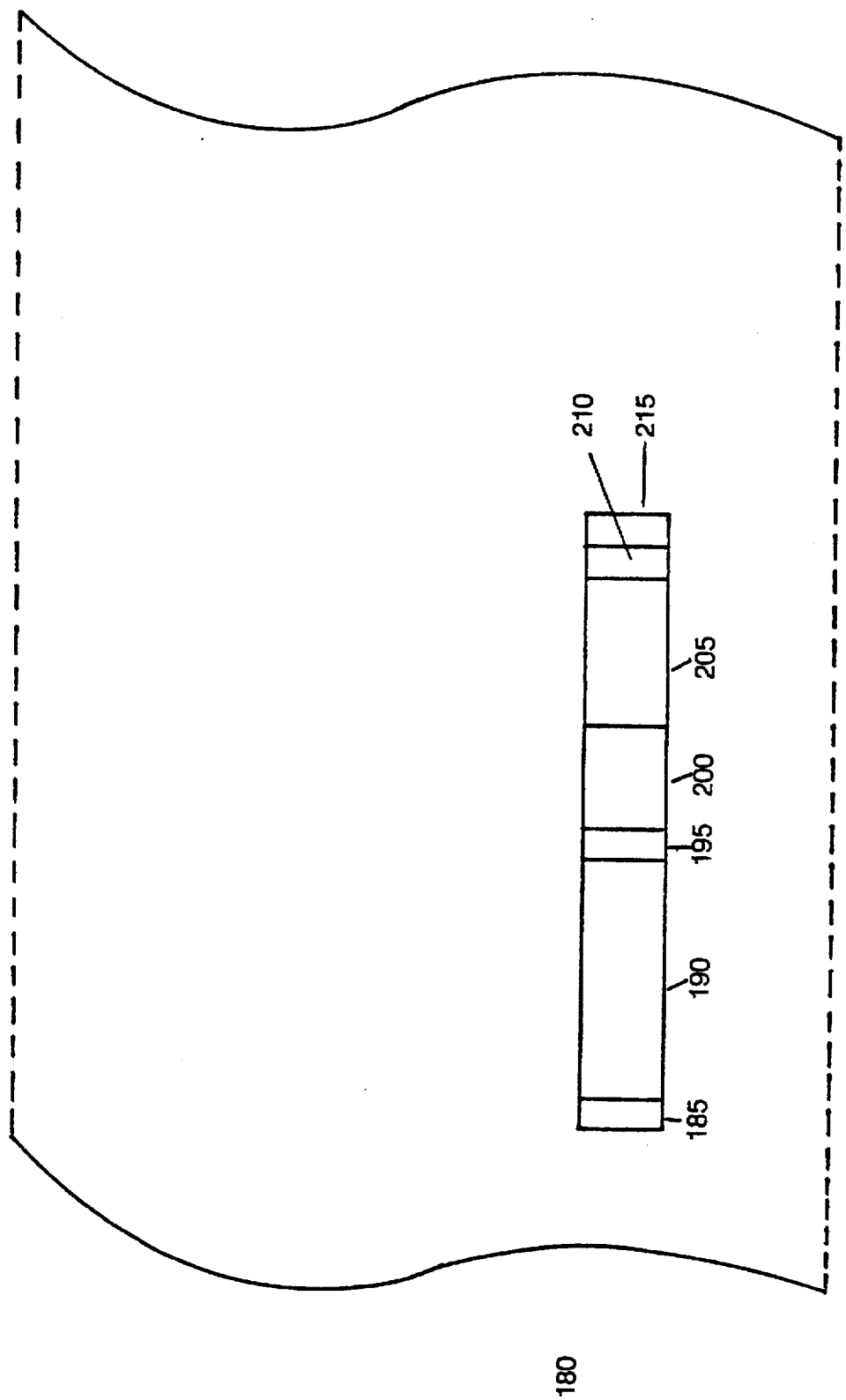
FIG. 6B is the ABCC magnetic strip arrangement from the reverse side of the ABCC classification card.
Figure 10:
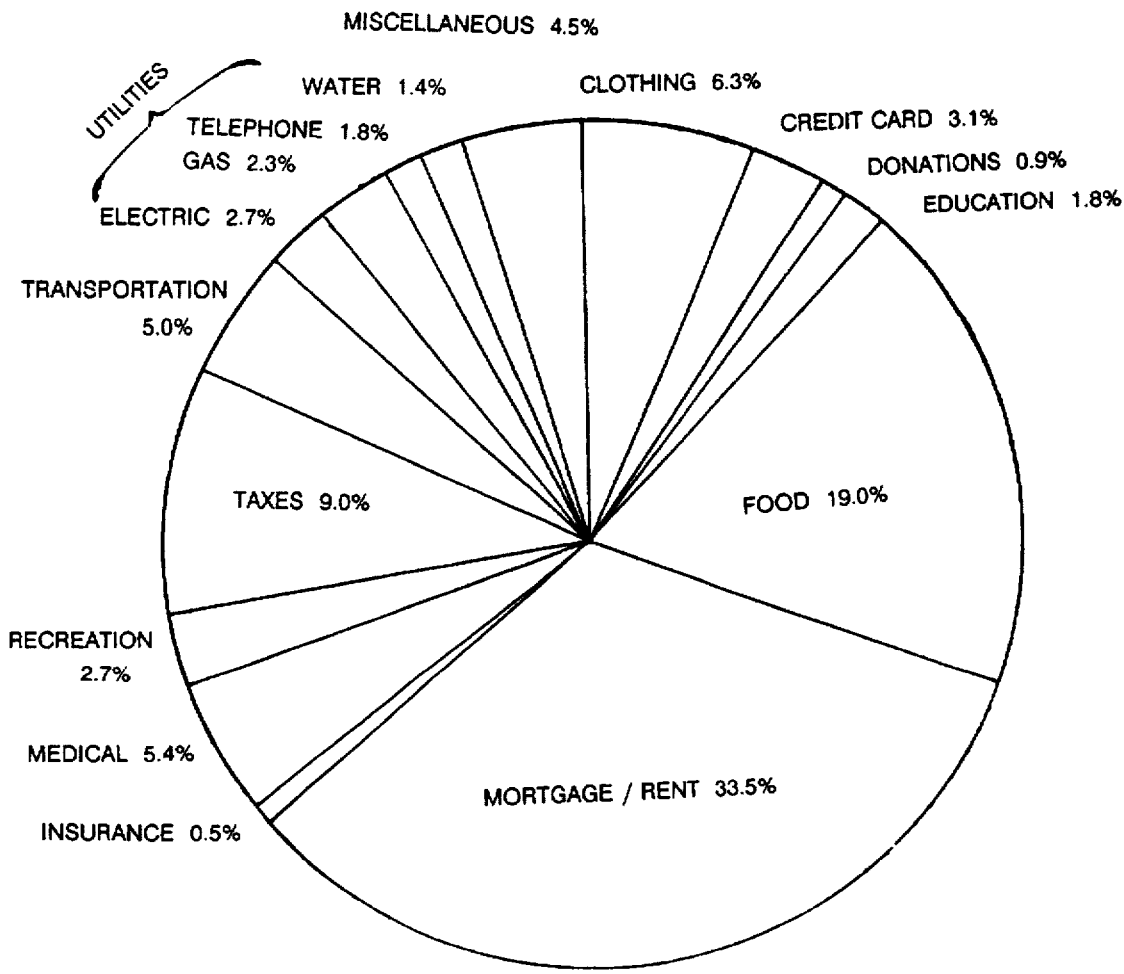
FIG. 10 is the pie chart representing the monthly ABCC expenditure classification system in percentages.

As an alternative embodiment, a data cards system controller can directly input the new ABCC classification expenditures of the new ABCC classification data card as defined under FIG. 7. Specifically, each ABCC expenditure classification and its corresponding magnetic binary code (or its numerical systematic equivalent) on a magnetic track of said card as designated under FIG. 6B. This ABCC information can then be merged with each ABCC initialized point of sales terminal serial number and together stored within the data cards system controller's database. Upon the input data amount from each credit/debit sales transaction, the data cards system controller can then merge said amount from the ABCC initialized point of sales terminal serial number together with the correct ABCC expenditure classification. The above-mentioned merge at the data cards system controller's database can be accomplished at FIG. 4, Step 14B. The data cards system controller can then send each captured and settled ABCC credit/debit sales transaction for further processing by the credit/debit card issuer for each cardholder. All standard operating procedures for all credit/debit card sales transactions continue as described under FIG. 1A at Step 4 and FIG. 1B at Step 4, respectively.

ADVANTAGES OF THE PRESENT INVENTION
[FIG. 9, FIG. 10]

By utilizing this unique classification card issued by the point of sales manufacturer to initialize each merchant's point of sales terminal, it will ultimately give the individual cardholder the personal convenience of having his credit/debit card issuer provide an accurate, well-organized monthly summation of his total sales purchases rendered according to each ABCC expenditure classification.

Moreover, the objective and novelty of this invention—one individual expenditure category for each uniquely binary-encoded (or any other numerical systematic code), color-coded ABCC classification card-captures in real-time the retail nature of any sales transaction data at the actual point of purchase (for example, purchasing goods and supplies, charitable organizations, or even vacations) and provides the most accurate means of achieving this goal.

Furthermore, once the expenditure classification of each individual retail sales transaction has been transferred to the credit/debit card issuer through the interchange computerized database network, it will be the objective and strategy of the credit/debit card issuer to translate this data into a meaningful, economic methodology.

Therefore, when this invention is fully deployed—the entire United States credit/debit card transactions as classified across the various expenditure categories—will allow United States economic forecasters unbridled and unprecedented analysis of what will be called DPI (Dynamic Power Index). This index, through powerful heuristic and inference statistical techniques, will be able to measure the summation of the entire consumer economic transactions in the United States according to every region, state, village, town and city—with no individual identification to the public.

Simply the wealth of this DPI database will be staggering. The potential benefits of knowing where the society has distributed to the penny and of having this information processed by speed and power of today's computers and ones yet to come will be phenomenal. Every company large and small doing business can have equal access to the most up-to-date, accurate, economic trend analysis known to our society. All formerly known historical, economic indicators covering this form of data will be obsolete.

Because real-time economic information is captured, extrapolated, and projected, this nearly instantaneous economic information will tremendously benefit business, financial and government policy makers. Waste can be drastically reduced; our precious resources for government, socio-economic programs can be allocated with more efficiency and precision; and even our gross national products (GNP) can eventually increase. Our economy will have the foundation for a revolutionary forecasting tool and model for the super information highway which will certainly be emulated. Nobel Prize economists can test their most potent, productive theories against this dynamic DPI database which will mirror a greater, sounder, superior global economy.

This invention presents the ultimate answer, advantage and informational power for individual consumer, and business—domestic and international alike.

Final note: The present invention is independent of any present/future state of the art hardware, software, firmware/microcode, and network systems. Further while embodiments of the present invention have been shown and described, various modifications may be made without departing from the spirit and scope of the present invention; and all such modifications and equivalents are intended to be covered. Therefore, rather than by the given examples alone, the entire scope of the present invention should be determined by the appended claims and their legal equivalents.

The embodiments of the invention in which an exclusive property or privilege is claimed are defined as follows:

1. A method of generating a summary record of expenditures in each of expenditure a plurality of categories incurred over a selected period by use of an authorization card issued by a financial institution;

a card used in conjunction with each card reader terminal to authorize a charge against a user's account with said financial institution, said terminal electronically communicating transaction data to said financial institution, said method comprising the steps of:

pre-programming said card reader terminal to generate a selected one of a series of code signals corresponding to each of said plurality of expenditure categories, said selected one of said code signals programmed to be generated by said terminal categorizing transactions at said terminal;

transmitting said selected one code signal to said financial institution in conjunction with communication of transaction data to said financial institution; and, preparing summary reports for said time period showing total transactions by date, vendor, and amount according to each expenditure category as identified by said code signals from each terminal, said summary reports presented to said card user.

2. The method according to claim 1 wherein said step of programming and reprogramming as needed said terminal, one of a series of terminal programming cards is swiped through a slot in said terminal to set said one code signal, each programming card in said series corresponding to a respective one of said categories to be programmed.

3. The method according to claim 2 wherein each programming card in said series of programming card is color coded to correspond to a respective category.

* * * * *